No. 628,839. Patented July 11, 1899.
J. N. NEWSOM.
BICYCLE GEARING.
(Application filed Aug. 4, 1898.)
(No Model.) 3 Sheets—Sheet 1.
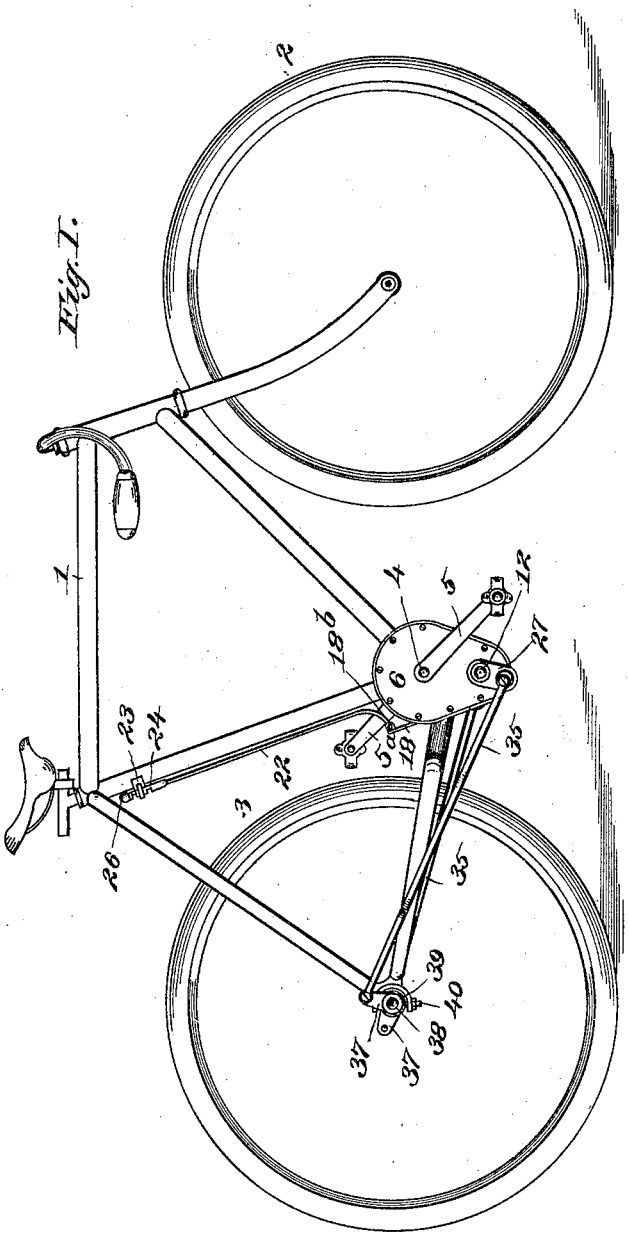
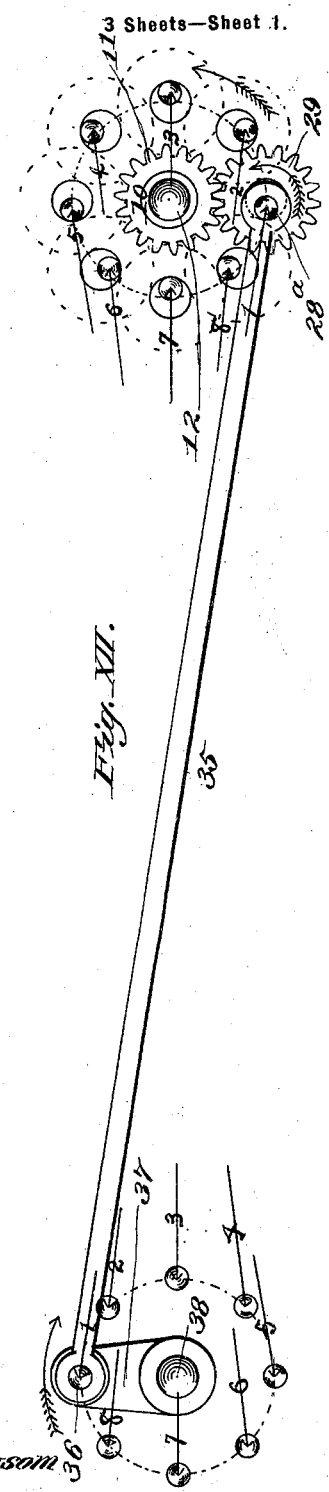
Witnesses
Inventor
Joseph N. Newsom
By Wright Bro
Attorneys

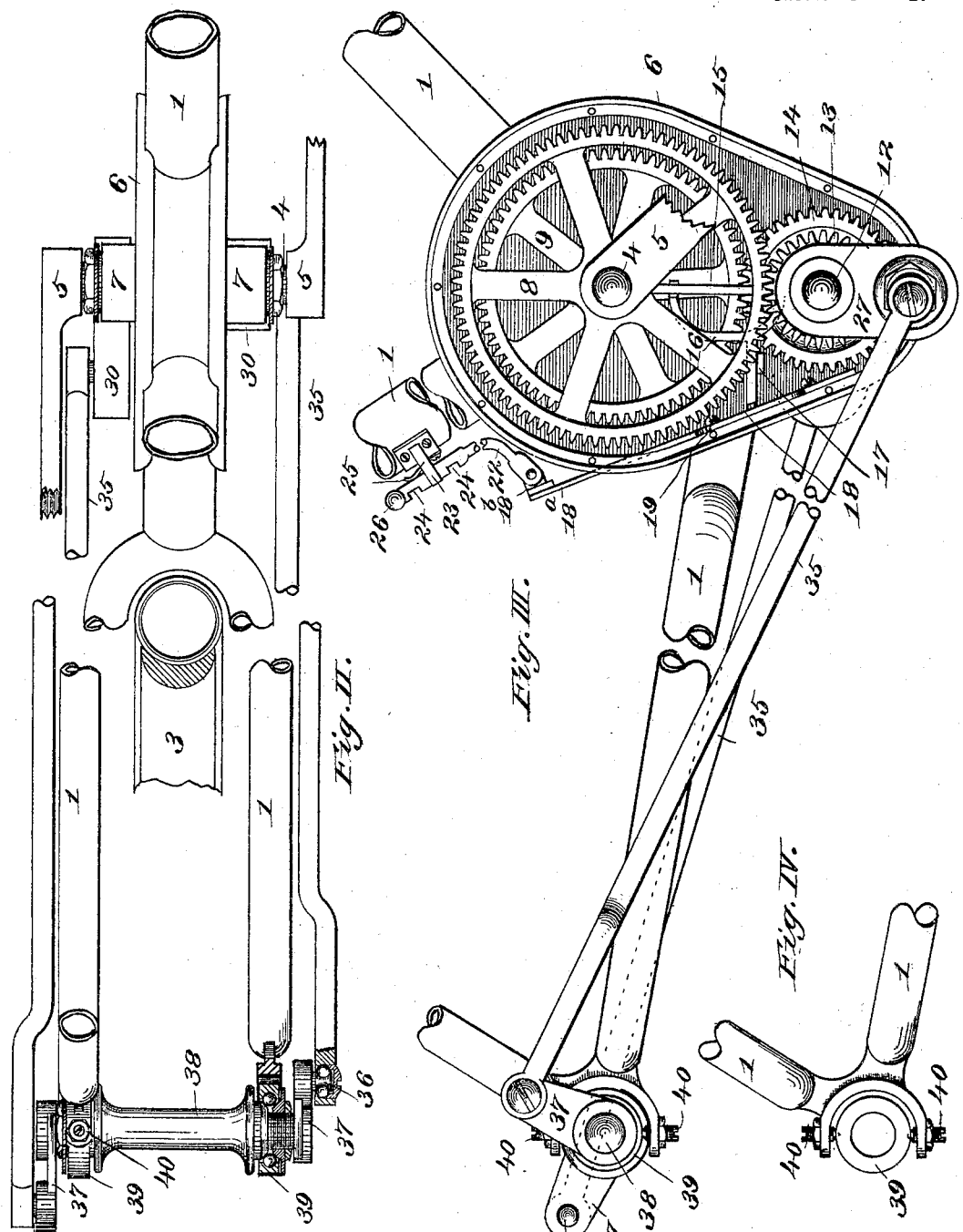

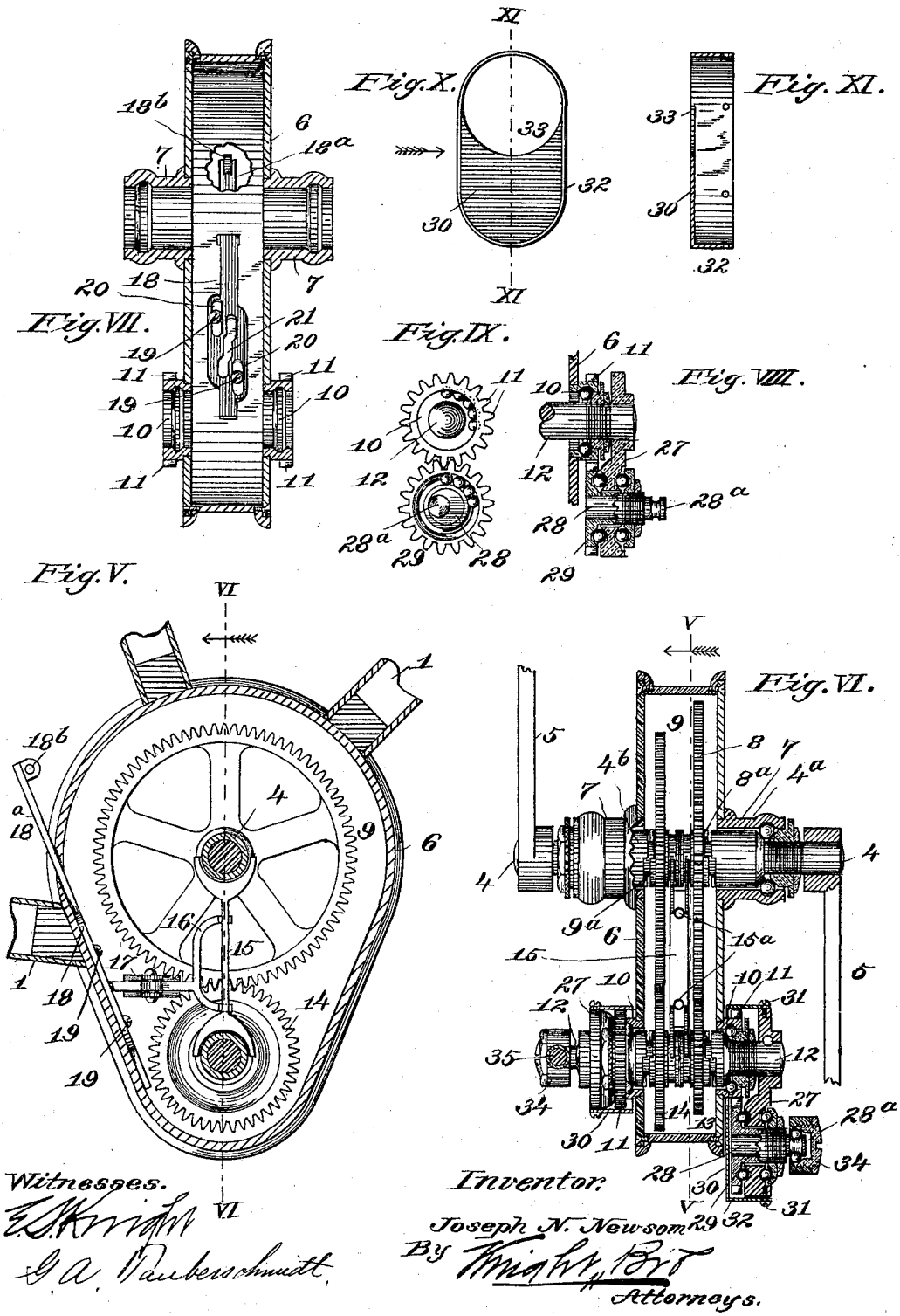

UNITED STATES PATENT OFFICE.

JOSEPH N. NEWSOM, OF ST. LOUIS, MISSOURI, ASSIGNOR OF THREE-FOURTHS TO EUGENE A. NEELY AND HEBER JONES, OF MEMPHIS, TENNESSEE, AND CHARLES B. LUMSDEN, OF CHICAGO, ILLINOIS.

BICYCLE-GEARING.

SPECIFICATION forming part of Letters Patent No. 628,839, dated July 11, 1899.

Application filed August 4, 1898. Serial No. 687,689. (No model.)

*To all whom it may concern:*

Be it known that I, JOSEPH N. NEWSOM, a citizen of the United States, residing at the city of St. Louis, in the State of Missouri, have invented a certain new and useful Improvement in Bicycle-Gearing, of which the following is a full, clear, and exact description, reference being had to the accompanying drawings, forming part of this specification.

My invention relates to that class of bicycle-gearings in which the power is transmitted from the crank-axle to the driving-wheel axle through the medium of connecting-rods.

The invention consists in features of novelty in the construction of parts to be hereinafter fully described, and pointed out in the claims.

Figure I is a side elevation of a bicycle equipped with my improved gearing. Fig. II is a plan or top view of the lower portion of the bicycle-frame, crank-axle, driving-wheel axle, and connecting-rods, with parts shown in horizontal section. Fig. III is a side view of the gearing and a portion of the bicycle-frame, one of the side walls of the gear-boxing being removed. Fig. IV is a detail side view of the end of one of the rear fork-arms of the bicycle-frame and one of the swivels that receive the driving-wheel axle. Fig. V is a vertical sectional view taken on the line V V, Fig. VI, through the gear-boxing and its inclosed parts, a portion of said parts being shown in elevation. Fig. VI is a horizontal sectional view taken on the line VI VI, Fig. V, parts of the gear being shown in top view. Fig. VII is a vertical sectional view of the gear-boxing, the gear-controlling clutch-operating slide being shown in elevation. Fig. VIII is a longitudinal sectional view of one of the auxiliary driving-cranks that connect with the gearing-connecting rods. Fig. IX is a side view of the pinion of one of the auxiliary driving-cranks and the toothed idler with which said pinion engages. Fig. X is a detail face view of the casing of one of the auxiliary cranks. Fig. XI is a sectional view taken on the line XI XI, Fig. X. Fig. XII is a diagram illustrating the relative travel of the auxiliary cranks and the cranks of the driving-wheel of the bicycle.

1 designates the frame of a bicycle of any common form, 2 the steering-wheel, and 3 the driving-wheel.

4 designates the crank-axle, and 5 the cranks on said axle. The crank-axle is mounted in a gear-inclosing boxing 6, that is carried by the bicycle-frame and is equipped with extended bearings 7, in which the crank-axle is journaled. On the central portion of the crank-axle 4 are a pair of gear-wheels 8 and 9 of different diameter. The gear-wheel 8 has a hub $8^a$, that is provided with clutch-teeth on its outer face that are adapted to be moved into engagement with clutch-teeth on an enlargement $4^a$ of the crank-axle. The gear-wheel 9 has a toothed hub $9^a$, adapted to be moved into engagement with a toothed enlargement $4^b$ to form a clutch. The hubs of the gear-wheels 8 and 9 are both loosely mounted on the crank-axle 4 and either one is free to turn without affecting the other. It is therefore apparent that when one of the gear-wheels is thrown into clutch connection with the coincident toothed crank-axle enlargement the other wheel is inoperative.

10 designates bearing-rings rigidly seated in the side walls of the boxing 6. These rings project exterior of the boxing and have teeth 11 on their peripheries. 12 is an auxiliary crank-axle mounted in said bearing-rings 10.

13 is a gear-wheel loosely mounted on the auxiliary crank-shaft, that is arranged to engage the gear-wheel 8 on the main crank-shaft. 14 is a gear-wheel also loosely mounted on the auxiliary crank-shaft, arranged to engage the gear-wheel 9. The gear-wheels 13 and 14, like those 8 and 9, are of different diameter and are of proper measurement to communicate with the mating wheel. It will be understood that the use of gear-wheels of varied diameter on the main and auxiliary crank-shafts permits of the attainment of variable speeds in the operation of the gearing, according to which set of gear-wheels is in gear. The auxiliary crank-axle and the hubs of the gear-wheels 13 and 14 thereon are provided with opposing clutch-faces similar to those of the main crank-axle and its gear-wheels. All of the four gear-wheels are designed to be shifted by one appliance to throw the clutches into or out of engagement. This appliance I will now describe.

15 designates a double spanner that has two arms at each end, (see Fig. VI,) that rest in grooves in the hubs of the gear-wheels 8, 9, 13, and 14.

16 is a forked rocking lever, the arms of the fork of which connect with the spanner 15 by entering apertures 15ª therein. (See Fig. VI.) The rocking lever 16 is pivotally mounted in a bracket 17 on one of the side walls of the boxing 6, interior of said boxing, (see Fig. V,) and the outer arm of the rocking lever projects beyond the pivot in said bracket.

18 designates a slide reciprocally mounted in the boxing 6 and having one end 18ª extending exterior of the boxing. The slide is held by screws 19, that are seated in slots 20 in the slide (see Fig. VII) and permit a limited reciprocal movement of the slide. In the slide is a cam-slot 21, that receives the outer arm of the rocking lever 16, this slot being provided for the purpose of causing the rocking lever to be thrown on the reciprocation of the slide 18 and in its movement carry the spanner 15 therewith to throw the gear-wheels into engagement with their clutches or out of such engagement. The slide 18 is intended to be operated by the bicycle-rider when mounted or dismounted and is moved by a pull-rod 22, that is connected to an eye 18ᵇ on the end of the slide. The upper end of the pull-rod extends to a position beneath the bicycle-saddle and is held to the bicycle-frame by a shackle 23. The rod is provided with notches 24, that the shackle enters, and it is backed by a spring 25 to hold it in any set position. At the end of the rod is a handle 26. When the pull-rod is in the position shown in Fig. III, the central pull-rod notch 24 is occupied by the shackle, the central portion of the cam-slot 21 in the slide 18 is occupied by the outer arm of the rocking lever 16, and the gear is in its intermediate position, both of the sets of gear-wheels 8, 9, 13, and 14 being free from their coincident clutches. When, however, the pull-rod is moved up or down to bring either of the outer notches 24 to the shackle 23, the slide 18 is moved to such an extent that the outer arm of the rocking lever 16 is thrown to one side or the other and the spanner is moved to carry the desired set of gear-wheels 8 and 13 or 9 and 14 into clutch engagement ready for application of motive power to the main crank-shaft.

Returning now to the auxiliary crank-shaft 12, this shaft has an auxiliary crank 27 keyed to it at each end. In each crank 27 is a shaft 28, having suitable ball-bearing. (See Fig. VI.) Each shaft 28 has at its inner end an integral toothed disk 29, that is arranged to mesh with the teeth 11 of the bearing-rings 10, and in the turning of the disks 29 with the cranks 27 the disks travel around the rings 10, which merely serve as idlers for the travel of the disks against them.

The inner sides of the auxiliary cranks and the parts carried thereby are inclosed by a casing 30, attached by screws 31 to the cranks. These casings have rims 32 and apertures 33 for the reception of the bearing-rings 10. The casing is shown in detail in Figs. X and XI.

At the outer end of each shaft 28 is a wrist-stud 28ª. Each of the wrist-studs receives a coupling 34 on the end of a connecting-rod 35. The connecting-rods 35 extend to the axis of the driving-wheel of the bicycle, where they are suitably attached to wrist-studs 36 on crank-arms 37, secured upon the ends of the driving-wheel axle 38. The driving-wheel axle 38 is mounted in swivel bearing-rings 39, that are set between pivot-screws 40, seated in the forked rear lower ends of the bicycle-frame. These swivel-rings enable the maintenance of the axle 38 in transverse line to the bicycle-frame, so that the driving-wheel will travel truly, and also so that the crank-arms 37 will be constantly in parallel lines to the connecting-rods 35.

It is a well-known fact that where two cranks are operated in union with a connecting-rod it is imperative that some means exist for allowing for the difference in the distances apart of the wrists of the cranks assumed during their rotary travel. In my construction this difference is allowed for by the use of the shaft 28, having the eccentric wrist-stud 28ª, and that the operation of the cranks and their connecting-rods may be clearly understood I have shown, Fig. XII, a diagram illustrative of the movement of the parts. The toothed disk 29, traveling around the toothed ring 10, causes the shaft 28, integral with such disk, to be revolved, these parts moving in the direction indicated by the arrow. At the opposite end of the diagram the drive-wheel-operating crank is shown and the wrist-stud of such crank is indicated in the various positions assumed by it in the travel of the crank, such positions being designated by numerals corresponding to the relative positions indicated and designated in like manner regarding the shaft 28 and its wrist-stud 28ª. The manner in which the wrist-stud 28ª is carried into varying positions to allow for the variations of distance between the said stud and the wrist-stud 36 is quite apparent.

I claim as my invention—

1. In a bicycle, the combination of a frame and ground-wheels, a gear-inclosing boxing, a crank-shaft mounted in said boxing, an auxiliary crank-shaft mounted in said boxing, intermeshing gears loosely mounted on said shafts, clutch mechanism for connecting said gears and the shafts on which they are mounted, a spanner connecting the gears on one of said shafts with those on the other shaft, a rocking lever engaging said spanner, a slide containing a cam-slot adapted to receive said rocking lever, means for operating said slide, and means for transmitting power from said auxiliary crank-shaft to the driving-wheel of the bicycle, substantially as described.

2. In a bicycle, the combination of a frame and steering and drive wheels, a main crank-shaft, an auxiliary crank-shaft, gearing arranged to connect said shafts, auxiliary cranks, rigidly-supported idlers surrounding said auxiliary shaft, shafts loosely mounted in said auxiliary cranks having means for engagement with said idlers and adapted to revolve therearound, wrist-pins carried by said last-named shafts eccentrically thereto, cranks carried by said drive-wheels, and crossed connecting-rods joining said wrist-pins and said drive-wheel cranks, substantially as described.

JOSEPH N. NEWSOM.

In presence of—
 E. S. KNIGHT,
 N. V. ALEXANDER.